Patented Oct. 8, 1940

2,216,816

UNITED STATES PATENT OFFICE 2,216,816

DENTIFRICE

Rudolph A. Kuever, Iowa City, Iowa, assignor to The Pepsodent Co., Chicago, Ill., a corporation of Illinois No Drawing. Application June 13, 1938, Serial No. 213,518

3 Claims. (Cl. 167—93)

The present invention relates to dentifrices and the like, and is an improvement on the invention disclosed and claimed in Patent No. 2,019,142, granted in my name October 29, 1935, and is a continuation in part of application Serial No. 142,198, filed in my name May 12, 1937.

Among the objects of the invention is to provide a novel dentifrice which contains a novel combination or composition of substances whereby the dentifrice has a high degree of polishing and cleansing action with no deleterious effect whatsoever on the enamel or cementum of the teeth; also has the property of more readily "slipping" over the surface of the teeth when applying the dentifrice thereto than heretofore; has, moreover, an unforeseen higher polishing power than the individual components would have if used separately; has, furthermore, the property of preventing syneresis ("bleeding") in the case when the dentifrice is in the form of a paste; and has the characteristic of eliminating the tendency of packing when the dentifrice is in the form of a powder.

Other objects, advantages, capabilities, properties, characteristics, features and the like are comprehended by the invention as will later appear and as are inherently possessed by the invention.

More specifically, my novel dentifrice comprises a combination or composition of insoluble sodium metaphosphate and a calcium salt. The great majority of available calcium salts will perform one or all of the functions herein disclosed. As an example of a calcium compound which will fail to perform at least one of the functions disclosed, calcium oxalate may be cited. The many calcium compounds which may be used with more or less satisfaction may be divided into two classes, namely, soluble and insoluble. It is preferable to choose an insoluble calcium compound since in this way the insoluble calcium compound itself serves as a polishing agent, especially in the case of a product in the form of a paste, where a soluble calcium compound might be more or less in solution. It is to be understood, however, that solubility in water does not predetermine solubility in the liquid phase of a paste composition, and that water soluble calcium compounds may serve all of the functions outlined even though the composition be in paste form.

It is understood that some calcium compounds such as calcium oxalate cited above, may be undesirable in that they may be poisonous, may have a disagreeable taste or odor or may have color characteristics which are undesirable. The following specific calcium compounds are illustrative of those which have been found to successfully fulfill the important functions outlined: mono, di and tri-calcium phosphates, calcium sulphate, calcium carbonate, calcium citrate, calcium lactate, calcium nitrate, calcium glycerophosphate, calcium benzoate, calcium chloride, calcium oxide, calcium hydroxide and calcium gluconate.

The selection of a specific calcium compound or of a mixture of specific calcium compounds to fulfill the functions set forth will rely more upon the inherent normal properties of these products than upon the specific functions described herein, since with such a wide variety of compounds, each of which can fulfill novel functions, the secondary characteristics will offer a basis of preference depending upon the exact type of product which is desired. I prefer to consider tri-calcium phosphate as an example of one of the most practicable calcium salts, and further recommend the choice of a calcium salt which of itself has heretofore been proven satisfactory and desirable as a dentifrice ingredient. The choice of a calcium compound to fulfill the specific purposes set forth should not, however, be limited either to a calcium compound previously used as a dentifrice ingredient, to a calcium compound in the list cited, or even to those calcium compounds at present known, since the evidence is strong that heretofore undeveloped calcium compounds may serve equally well.

When making a paste of insoluble sodium metaphosphate as a polishing agent alone a cream is produced which is translucent. The tooth paste science, however, has established that the paste should be opaquely white. By my invention I produce a dental cream in which I use, as a polishing agent, a combination or composition of insoluble sodium metaphosphate and a calcium salt, such cream having the desired opacity and color.

Ground insoluble sodium metaphosphate because of the shape and size of its particles, binds and is difficult to move, as through the ducts of the manufacturing devices and also as through the outlet of the tooth paste tube when the paste is subjected to pressure. In other words, the resistance to strain is very high. To make the dentifrice in the most sanitary way it is necessary it be not touched by nor handled with the hands of the workers. It should be mixed and manipulated by modern machinery and pumps and fed through pipes or ducts to the filling machines where, under sanitary conditions, the dentifrice is fed into collapsible tubes.

I have discovered that when a calcium salt is incorporated with the insoluble sodium metaphosphate, a desirable "slip" is obtained, that is, the resistance to strain or fluidal flow is greatly reduced. This is very valuable in the manufacturing process and also when exuding the paste from the tube.

Also, when a tooth paste is made with only insoluble sodium metaphosphate as a polishing agent, the interparticle spaces are such as to release the fluid phase and the paste undergoes, with pressure on it, syneresis, or "bleeding" as it is more commonly termed. I have discovered that the incorporating of a calcium salt will prevent this condition. Calcium salts are capable of being extremely finely powdered even to the particle size of a micron. So far as I can ascertain this fine powder apparently fills the interstitial spaces of the insoluble sodium metaphosphate component with the massing agent and prevents the oozing or "bleeding" of the liquid phase. The presence of the calcium salt also materially increases the "slip" so that a minimum of pressure is necessary to move it in pipes or ducts of the manufacturing apparatus and the outlet of the tooth paste tube, "bleeding" being prevented at all such points. Accordingly, the including of the calcium salt as a component prevents syneresis or "bleeding" by (a) filling the interparticle spaces of the insoluble sodium metaphosphate, and (b) increasing the "slip" of the finished paste. The larger the interparticle spaces and the lower the slip the greater the syneresis. My invention eliminates such conditions altogether.

In the case of a tooth powder, if the insoluble sodium metaphosphate is used alone it has a tendency to pack and not to sift or flow freely from the container. By incorporating a calcium salt these disadvantages or tendencies are totally overcome. Likewise, the addition of the calcium salt furthermore greatly increases the adhering property of the dentifrice to the tooth brush, thus adding to the efficiency of cleaning the teeth. Another advantageous feature of the present invention is that because of the improved physical condition of the particles by reason of using a calcium salt it is much easier to retain the flavor in the tooth powder. The calcium salt affords to the dentifrice a much greater adsorptive power. The insoluble sodium metaphosphate alone has such a very low adsorptive power that the flavor in such case is readily lost by evaporation.

It is economically commercially extremely difficult, if not impossible, to manufacture 100% pure insoluble sodium metaphosphate. As I use it there is a maximum of 3% of soluble material formed in the insoluble sodium metaphosphate from mono-ortho-sodium phosphate. This soluble material is acidic in reaction. The addition of a suitable calcium salt, particularly, for example, the addition of tri-calcium phosphate, has the property of buffering this acidic reaction. However, the fulfillment of the functions set forth does not appear to be directly or essentially dependent upon such buffering action insofar as the word "buffering" is used to imply a control of acidity. While it is true that the addition of a calcium compound in sufficient quantity to accomplish such buffering of acidity will inherently fulfill the other functions described, it is pointed out that the addition of a calcium compound which is in itself acidic may also fulfill such functions. It is further pointed out in connection with the use of the word "buffering," that while most commonly used to describe a regulation of acidity, other chemical activities may also be buffered and that the addition of any calcium compound will buffer the tendency of the mixture in which it has been incorporated to react by dissolving calcium from another source.

The proportions of the ingredients may vary between wide limits without departing from successful results or the spirit of my invention. For illustration I can use less than one per cent of calcium compound (preferably tri-calcium phosphate) to more than ninety-nine per cent by weight of insoluble sodium metaphosphate. I can also use more than fifty per cent by weight of calcium compound but prefer to use less than fifty per cent. The reason for preferring to use less than fifty per cent by weight of calcium compound is simply that the unusual and desirable cleansing and polishing actions of insoluble sodium metaphosphate become less pronounced when the proportion of this desirable substance is unduly reduced in favor of unnecessary quantities of calcium compound. However, for producing generally optimum results for the various purposes of my invention, satisfactory results are obtained by the following proportions:

| | Per cent |
|---|---|
| Insoluble sodium metaphosphate | 93 |
| Calcium compound (preferably tri-calcium phosphate) | 7 |
| | 100 |

In the formula given above it is understood that any of the calcium compounds set forth in this application when used in the proportion indicated with a reasonably pure grade of insoluble sodium metaphosphate will serve to fulfill one or more of the other functions outlined. It is understood that this general formula may be modified by the addition of flavoring agents, detergents, colors and such other of the customary dentifrice ingredients as may be desired and as may be compatible with this basic formula. It is also understood that the calcium compound chosen will to some extent influence the taste, feel and other properties of the dentifrice.

More specific formulas which have been found to be superior to dentifrices made with insoluble sodium metaphosphate alone in that the other functions herein set forth have also been fulfilled, but which also have been found to represent satisfactory practical formulas, are as follows:

Tooth powder

| | Per cent |
|---|---|
| Insoluble sodium metaphosphate | 76.8 |
| Tri-calcium phosphate | 20.0 |
| Alkyl sulphate | 1.0 |
| Saccharine | 0.2 |
| Flavors | 2.0 |
| Insoluble sodium metaphosphate | 50.0 |
| Tri-calcium phosphate | 10.0 |
| Sodium bicarbonate | 33.85 |
| Detergent | 1.0 |
| Gum | 3.0 |
| Saccharine | 0.15 |
| Flavor | 2.0 |
| Insoluble sodium metaphosphate | 50.0 |
| Calcium sulphate dihydrate | 46.85 |
| Alkyl sulphate | 1.0 |
| Saccharine | 0.15 |
| Flavor | 2.0 |

|  | Per cent |
|---|---|
| Insoluble sodium metaphosphate | 81.85 |
| Tri-calcium phosphate | 10.0 |
| Soap | 6.0 |
| Saccharine | 0.15 |
| Flavor | 2.0 |
| Insoluble sodium metaphosphate | 50.0 |
| Calcium carbonate | 43.35 |
| Gum | 3.0 |
| Alkyl sulphate | 1.5 |
| Saccharine | 0.15 |
| Flavor | 2.0 |
| Insoluble sodium metaphosphate | 96.8 |
| Tri-calcium phosphate | 1.0 |
| Saccharine | 0.2 |
| Flavor | 2.0 |

*Tooth paste*

|  | Pounds |
|---|---|
| Insoluble sodium metaphosphate | 150.0 |
| Tri-calcium phosphate | 10.0 |
| Gum | 1.6 |
| Glycerin (75%) | 90.0 |
| Alkyl sulphate | 3.2 |
| Saccharine | .054 |
| Alcohol | 1.746 |
| Flavor | 2.0 |
| Insoluble sodium metaphosphate | 10.0 |
| Calcium citrate | 0.4 |
| Gum | 0.33 |
| Glycerin (75%) | 6.25 |

Add detergent and flavors as desired.

| | |
|---|---|
| Insoluble sodium metaphosphate | 75.0 |
| Di-calcium phosphate | 0.75 |
| Gum | 2.5 |
| Glycerin (60%) | 50.0 |

Add detergent and flavors as desired.

The specific formulas just given have all been found practical, workable formulas to achieve the ends set forth. It is to be understood, however, that the specific formulas should not be construed to set any limitations upon the scope of the invention or to imply that the use of different calcium compounds or different percentages thereof or the inclusion of other desirable ingredients or the exclusion of any of the additional ingredients specified in these formulas are not to be permitted within the scope of the invention as set forth. Specifically it may be pointed out that the practical formulas given all call for the use of insoluble calcium compounds, which are considered preferable, but that the soluble calcium compounds may be substituted without departing from my invention.

In the disclosure as made and in the examples as given, the amount of calcium compound is in all cases deemed to be in excess of the minimum amount to accomplish the functions set forth. The scope of this application should, therefore, cover the use of a calcium compound in quantities substantially less than those set forth as most desirable.

Having now described my invention, I claim:

1. A dentifrice composition containing insoluble sodium metaphosphate and tri-calcium phosphate reduced to fine particles so as to act as a polishing and cleansing agent.

2. A dentifrice composition comprising insoluble sodium metaphosphate and calcium phosphate, to act as a polishing and cleansing agent.

3. A dentifrice containing, as its essential ingredients, sodium metaphosphate and a calcium salt.

RUDOLPH A. KUEVER.